United States Patent [19]

Moriguchi et al.

[11] Patent Number: 5,287,650
[45] Date of Patent: Feb. 22, 1994

[54] STRUCTURED MEDIUM FOR THE CULTIVATION OF GREENERY AND A WATERPROOFING SYSTEM TO FACILITATE THE INSTALLATION OF SAID MEDIUM ON BUILDINGS

[75] Inventors: Goro Moriguchi; Seiichiro Ishihara, both of Osaka; Masatosi Kubo, Hyogo; Akira Tsubota; Takeshi Nakai, both of Shiga, all of Japan

[73] Assignee: Asanuma Corporation, Osaka, Japan

[21] Appl. No.: 776,587

[22] Filed: Oct. 8, 1991

[30] Foreign Application Priority Data

| Oct. 8, 1990 | [JP] | Japan | 2-271010 |
| Oct. 26, 1990 | [JP] | Japan | 2-290089 |
| Nov. 30, 1990 | [JP] | Japan | 2-339070 |
| Mar. 14, 1991 | [JP] | Japan | 3-75604 |

[51] Int. Cl.⁵ ............................................. A01G 31/00
[52] U.S. Cl. .......................................... 47/59; 47/82
[58] Field of Search .......................... 47/82, 83, 59, 62

[56] References Cited

FOREIGN PATENT DOCUMENTS

| 0047365 | 3/1982 | European Pat. Off. |
| 2444436 | 3/1976 | Fed. Rep. of Germany . |
| 2704414 | 9/1978 | Fed. Rep. of Germany .......... 47/82 |
| 3041534 | 6/1982 | Fed. Rep. of Germany .......... 47/83 |
| 3708491 | 9/1988 | Fed. Rep. of Germany .......... 47/83 |
| 3815662 | 12/1988 | Fed. Rep. of Germany .......... 47/83 |
| 3805069 | 9/1989 | Fed. Rep. of Germany . |
| 3936264 | 5/1991 | Fed. Rep. of Germany .......... 47/83 |
| 2549692 | 2/1985 | France . |
| 50-33925 | 11/1975 | Japan ........................................ 47/59 |
| 55-9739 | 1/1980 | Japan .............................. A01G 1/00 |
| 61-25408 | 2/1986 | Japan .............................. A01C 1/04 |

Primary Examiner—Ramon S. Britts
Assistant Examiner—Joanne C. Downs
Attorney, Agent, or Firm—Thompson, Hine and Flory

[57] ABSTRACT

The invention enables the rooftop cultivation of turf which can both be walked upon and which also helps prevent temperatures from rising in rooms below the roof by shielding it from the sun. The structured cultivation medium itself comprises three layers of synthetic plastic material, a top layer for turf cultivation, a middle layer to protect the roots and a bottom layer to drain water away. A root blocking waterproofing layer is laid on the surface of the roof slab to waterproof the building and to guard against the downward encroachment of roots. A net is also laid on top of the turf both to prevent it from being damaged by wind and also protect it against concentrated loads.

20 Claims, 4 Drawing Sheets

STRUCTURED MEDIUM FOR THE CULTIVATION OF GREENERY AND A WATERPROOFING SYSTEM TO FACILITATE THE INSTALLATION OF SAID MEDIUM ON BUILDINGS

BACKGROUND OF THE INVENTION

1. Field of the Invention

The invention relates to the provision of a structured medium suitable for the soil-free cultivation of turf and other greenery on the roofs of buildings such as offices or apartment blocks, thereby improving the appearance of said buildings while at the same time providing lawns on which people are free to stroll and relax. Reference is also made to a system for the waterproofing of buildings on which said medium is installed.

2. Description of the Prior Art

The roofs of buildings have for long now been fitted with systems of one sort or another to protect them from water damage. These systems can be divided into two broad types, namely the "protecting concrete" type of system and the "exposed waterproofing" type of system. The use of a protecting concrete type of system involves the laying first of an asphalt waterproofing course and then of the placing a layer of concrete over this in such a way that the asphalt waterproofing course cannot easily be damaged by the application of a concentrated load in any one place. This in turn makes it possible to walk on the roof. The use of the exposed waterproofing type of system, on the other hand, involves the laying of an asphalt waterproofing course only without the addition of a protective concrete covering with the result that the waterproofing course can easily be damaged by the application of a concentrated load. This type of roof covering is not, therefore, suitable for walking on. Bearing in mind the cost of land in urban centers, however, a comparison of these two types of system suggests that better value may be gained from the use of a protecting concrete system which can be walked on on a daily basis. However, the use of a protecting concrete system also necessitates the incorporation of expansion joints into the concrete layer as a means of allowing for thermal expansion and this also, of course, means substantial additional installation time and cost. Repair of the waterproofing layer also necessitates the prior removal of the concrete covering which creates a considerable job management headache of its own.

Moreover, for those living or working on the top floor of a building, the use of either the protecting concrete system or of the exposed waterproofing system gives rise to a similar environmental problem in that when the weather is very hot and the sun causes the roof itself to become extremely hot, the radiant heat heats the roof slab itself and the resultant heat is transferred into the room below. When this occurs there is invariably a most unpleasant sensation of heat radiating from the ceiling even with the air conditioning system running at full power. Artificial turf is also sometimes laid on roofs but this simply serves to improve the appearance of the roof area and has not been found effective in solving the problem of heat. Moreover, even is the roof slab is fitted with some sort of thermal insulation, this cannot completely prevent the conduction of heat into the room below and once the heat has built up inside the room in this way, the thermal insulation materials will then serve only to impede its emission back out of the building during the night.

It is thus currently the case that roofs and other upper areas of buildings are rarely used as anything other than convenient spots for the installation of cooling towers or for the drying of laundry. However, with the proliferation of high rise buildings we have also begun to see more interest being taking in improving the appearance of roof and balcony areas through, example, the laying of turf and the cultivation of flowering plants and shrubs in order to improve the environment by adding to the amount of greenery we are able to enjoy during the course of our daily lives. There are currently two main ways of growing grass and other plants on the roofs of buildings. One of these involves the laying of earth on the roof of a building in order to create a sort of artificial bedding soil. An alternative method involves the use of either rock wool or polyurethane foam for the creation of beds for the cultivation by hydroponic means, for example, of vegetables or flowering plants (for example, Japanese Patent Laying Open No. S55-9739 and S61-25408). However, with the first method outlined above, it is necessary to build up the basic soil bed to a depth of between 10 cm and 20 cm if it is to be possible to walk or sit on and around the turf, plants and shrubs which are eventually grown in this soil. It is also important to take steps to guard against the impairment of the roof waterproofing course through the encroachment of roots into the roof slab and to deal with water leaks. The laying of soil to a depth of 10 cm on the roof will also result in the application of an additional load of approximately 170 kg/m$^2$ to the roof slab which will consequently require adequate reinforcement. Japanese building standards provide for a maximum permissible live load on roofs or balconies of 180 kg/m$^2$ and it is clear, therefore, that the regulatory limit could easily be exceeded simply by walking on a roof or balcony covered with this thickness of soil. Soil may also easily be dislodged during rainfall and subsequently come to create a blockage in drainage channels. In the case of the second method outlined above, although there is little chance of the sort of overload problem encountered with the first method, the purpose is hydroponic cultivation which means that it also offers little scope for strolling or even just lying down amidst the greenery.

When considering the addition of greenery to roofs and balconies in the sorts of ways outlined above, it is, of course, also important to find ways of protecting the whole building from damage by water.

SUMMARY OF THE INVENTION

It is the principal object of the invention to provide a new type of structured medium which will permit the soil-free cultivation of grass, plants and bushes on concrete roofs and balconies, for example, such that it is also possible to walk on the finished lawn. This will enable us both to add to the overall amount of greenery in our environment while at the same time improving the appearance of parts of buildings such as their roofs and in this way to add to the environmental vigor of our urban centers.

It is another object of the invention to improve said structured medium through the incorporation into the interior of the medium of a system of water pipes through which either hot or cold water can be passed in order to ensure that the medium is maintained at an appropriate temperature and moisture level throughout the year, thereby obviating the risk of decaying roots and withering which could result from abnormal temperature rises or freezing. It is still another object of the invention to provide the system with a water and liquid fertilizer supply means such that greenery may then be actively cultivated by feeding it with appropriate quantities of water and liquid fertilizer in accordance with a predetermined program.

It is a further object of the invention to disclose a method of waterproofing which will enable greenery to be grown directly on the roof or balcony of a building with the help of said structured medium while at the same time dispensing with the need for the type of concrete covering which has conventionally been held to be necessary where people are likely to walk on said roof or balcony.

The objects of the invention outlined above plus other objects, features and merits not outlined above may be clarified by reference to the following detailed explanations and drawings.

DESCRIPTION OF THE PREFERRED EMBODIMENTS

Figure 2:
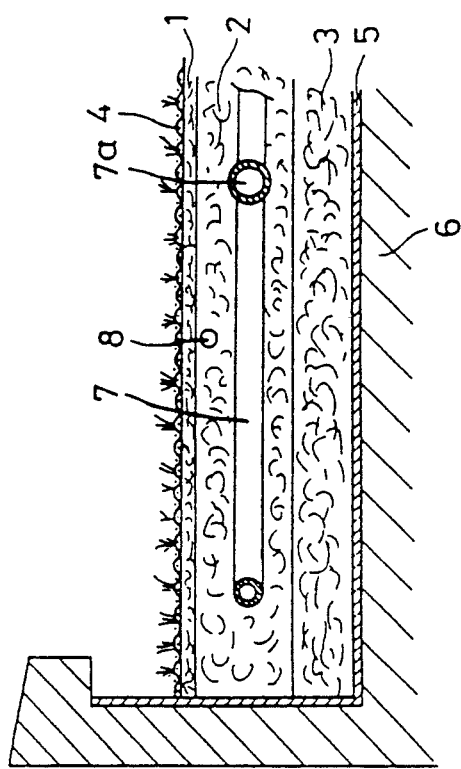
FIG. 2 is a cross sectional view of the second preferred embodiment of the invention wherein the structured medium of FIG. 1 has also been fitted with an additional water supply system and temperature sensor.

There follows a description of the preferred embodiments of the invention by reference to the accompanying drawings. The first preferred embodiment illustrates the basic structure of the structured medium, namely three distinct layers where 1 is the first or cultivation layer, 2 is the second or protection layer and 3 is the third or drainage layer. Another embodiment may be formed by the addition of two further elements, namely a synthetic plastic net 4 which is laid on top of the basic triple layered structural medium and a synthetic plastic sheet 5 which is laid at the bottom of the medium for the combined purpose of preventing water from leaking out while at the same time preventing roots from encroaching onto the roof slab.

The cultivation layer 1, on which seed may be sown in order to grow grass and plants, is made of a 5 mm thick non-woven fabric with an apparent density of 0.11 g/cm$^3$ and consisting primarily of synthetic fibers such as polyester, polypropylene and acryl used either on their own or alternatively combined by needle punching with some sort of water absorbent fiber in a suitable ratio of say 15% to 30% to form a fiber web. The addition of a water absorbent fiber increases the moisture retention characteristic of the cultivation layer 1 and this is in turn effective in inhibiting a fall in the rate of germination which may result from drying out of the seed beds. Man-made fibers such as rayon, however, are prone to decomposition if they are kept too moist for too long and acryl based fibers are for this reason to be preferred. Moreover, since the cultivation layer 1 also plays an instrumental role in the germination of the seeds, it is essential that it should have good moisture retention characteristics along with an adequate level of ventilation, water permeability and drainage. An adequate level of performance could be obtained from a structured medium with a moisture retention performance of, for example, 2.4 kg/m$^2$, a ventilation rate of 178 cc/cm$^2$/sec and a vertical water permeability coefficient of 1.5 cm/sec. Since plant roots exhibit a negative phototropic tendency, it is better not to use white material for the cultivation layer 1 but to use a darker color which shields the light more effectively. Dark green is the best color to use in view of its visual properties. Next comes the protection layer 2 which provides the roots of the plants with the kind of carefully protected environment in which they are able to grow freely. The apparent density of the protection layer 2 should be as high as possible. The layer must also be well ventilated in order to ensure a plentiful supply of oxygen and possess adequate moisture retention characteristics while at the same time permitting water to permeate both vertically and horizontally in order to maintain a continuous supply of fresh water which will help prevent the roots from decaying. A protection layer 2 typically used by the inventors comprised a plurality of layers of needled non-woven polyester fiber with an apparent density of 0.23 g/cm$^3$, moisture retention of 6.0 kg/m$^2$, a ventilation rate of 36 cc/cm$^2$/sec, a vertical water permeability coefficient of 0.23 cm/sec and a thickness of approximately 10 mm. This material has a low compressibility factor of 7.6% combined with a high recovery factor of 94% (in the case of a load of 800 g/cm$^2$). Excellent characteristics were also exhibited by a protection layer of non-woven fabric of the type described above into which had been interspersed a second non-woven fabric consisting of a slender fiber with an apparent density of 0.05 g/cm$^3$, moisture retention of 40 kg/m$^2$, a ventilation rate of 122 cc/cm$^2$/sec and a vertical water permeability coefficient of 3.5 cm/sec along with a compressibility factor of 17% and a recovery factor of 90%. Since roots exhibit a negative phototropic tendency, it is preferable that this protection layer 2 should be of a dark color rather than white.

In the case of the drainage layer 3, it is absolutely essential that it has drainage characteristics capable of handling torrential rain of anything from 50 mm up to 100 mm per hour. It is also important that the drainage layer 3 should not give rise to root rot. There now follow a number of examples of drainage layers which meet these sorts of conditions. In the first example the drainage layer 3 is made of the same sort of non-woven fabric which is used for the cultivation layer 1 and the protection layer 2. The type of non-woven fabric used for the drainage layer 3, however, should have a high level of fiber porosity while the fiber density should also be lower than that of the other two layers. The fiber should not, however, have an elastic recovery factor so low as to allow it to deform nor a deformation factor high enough to produce an unpleasant sensation in anyone walking over it. With these requirements in mind, the inventors opted for a drainage layer 3 consisting of a 30 mm to 60 mm thick non-woven fabric mat made up of anything from 500 to 5,000 denier vinylidene fiber. This material has a deformation factor of less than 40% of its thickness when subjected to a load of about 900 kg/m$^2$ and a high elastic recovery factor of 80%. The material also exhibits an extremely high level of air-permeability. Although this type of non-woven fabric mat can, of course, be used as it is to form the drainage layer 3, it is also perfectly acceptable to combine the mat with another water-permeable non-woven fabric preferably of about 10 mm in thickness and made up of 15 to 30 denier polyester fiber. This second option has the effect of improving the ability of the structured medium as a whole to withstand the pressure of people walking on it. For the second example, a structure has been selected which offers improved drainage characteristics. This is achieved by the use of plastic surface and base plates which are separated from each other by a plurality of spacers which serve to ensure that there is always a gap between the plates. The surface plate should be made of a porous plastic to permit excess moisture to pass though it. This type of drainage layer has a much more sturdy structure than the sort of drainage layer described in the first example above. This type of structure is thus particularly effective in cases where the protection layer 2 is of a thickness to permit an adequate measure of elasticity, for example, or where the cultivation layer 1 and the protection layer 2 are likely to acquire a measure of elasticity as the plants start to grow. Moreover, if the surface of the base plate is smooth then this will assist the efficient drainage of the water although the surface may equally be made deliberately rougher in order to afford a measure of moisture retention if so required In the second example corrosion resistant materials such as stainless steel or aluminium may be used in place of plastic. In the third example the drainage layer 3 is made of porous ceramic or plastic bricks laid side by side. The point which requires particular attention in this case is the lateral drainage function. Vertical drainage is not, of course, a problem in view of the porosity of the bricks but, if the bottoms of the bricks are made overly smooth, then this will deny a suitable drainage outlet for the water which has collected in the porosities in the bricks. Damage can be prevented, however, by fitting feet on the bases of the bricks in order to ensure that there is an adequate channel below the bricks for the lateral flow of water.

The preferred embodiments of the invention are thus constructed by the successive installation of a cultivation layer 1, a protection layer 2 and a drainage layer 3, each of which is structured in the manner outlined above. As shown in the drawings, the drainage layer 3 is first laid directly onto the concrete surface of the roof, the protection layer 2 is then laid over the drainage layer 3 and finally the cultivation layer 1 is added as the top layer. There is no objection to interposing additional layers or fabrics between the layers described above providing that this does not interfere with the basic functioning of each of three main layers. It is equally unnecessary for the individual layers to adhere to each other when laid. This is because when the plants grow the extension of their roots through the medium will serve to bind all the layers tightly together.

Grass and other plant seeds are sown onto the cultivation layer 1. This operation can be carried out with equal effect either immediately after the cultivation layer 1 itself has been laid or else after the net 4 has been laid over the top of the cultivation layer 1. It is also possible to sow seed onto the cultivation layer 1 and allow it first to germinate before laying that layer on top of the protection layer 2. It is important to note that if seed is sown onto the cultivation layer 1 after it has been laid then it will also be necessary to keep the material moist to ensure successful germination. A damp cloth or mat laid over the top of the cultivation layer 1 is particularly effective for this purpose and this also has the additional advantage of preventing the seed from being scattered by high winds. It must not be forgotten, however, that adequate allowance must also be made for ventilation. There now follows a more detailed description of the net 4 and the sheet 5. The net 4 is laid on top of the cultivation layer 1 and secured round the edge by retaining fittings of some sort at intervals of between 30 cm and 50 cm. The purpose of the net is to help spread the load imposed by a person walking over the surface of the medium or of a mowing machine which may be used to cut the grass. If the net 4 is secured directly to the roof 6 by means of retaining fittings such as anchor bolts, for example, then this will have the effect of protecting the whole of the structured medium against strong winds. A net 4 might typically be made of high density polyethylene with a large mesh of between 10 mm and 30 mm, lateral tensile strength of 500 kg to 1,000 kg and a weight of anything from 500 to 1,000 g/m$^2$. In the case of the sheet 5, on the other hand, its principal functions of waterproofing and the prevention of encroachment by roots call ideally for a soft vinyl chloride of between 1 mm and 3 mm in thickness.

A structured medium structured in the manner described above can be held to an overall weight of as little as 40 to 60 kg/m$^2$ with the result that even with the additional weight of a human being, it is still unlikely that the maximum permissible live load restriction of 180 kg/m$^2$ will be exceeded. Moreover, since the use of a net 4 has the added effect of dispersing the load, there is equally unlikely to be a problem even should a number of people gather temporarily at one particular point.

Figure 1:
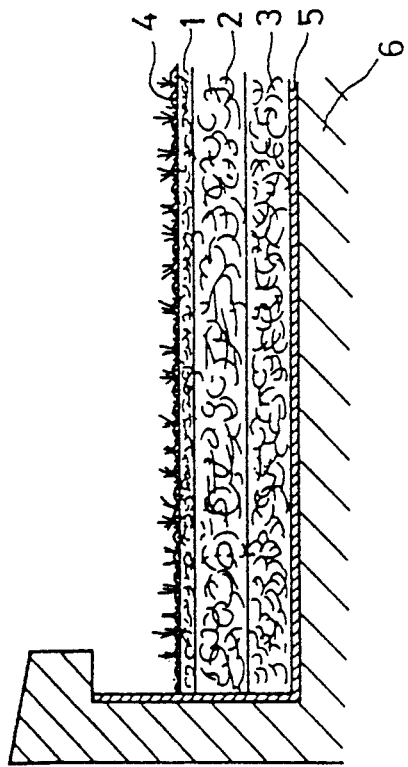
FIG. 1 is a cross sectional view of the first preferred embodiment of the structured medium of the invention installed on a roof.

FIG. 2 illustrates the same preferred embodiment as FIG. 1 but with the addition of a water piping system 7 which conducts either hot or cold water through the interior of the structured medium and a temperature sensor 8 which is used to detect the temperature inside the structured medium.

It is, of course, of particular importance to ensure that the protection layer 2 is kept at a suitable temperature if problems such as root rot resulting from temperature fluctuations or damage to roots due to freezing are to be avoided and the withering of the plants prevented. It is desirable, therefore, that one or more temperature sensors 8 be fitted as appropriate at or close to the center of the protection layer 2 as shown in FIG. 2. For reasons similar to those outlined above, it is also most effective if water piping 7 is fitted within the protection layer 2 as shown in the same figure.

Figure 3:
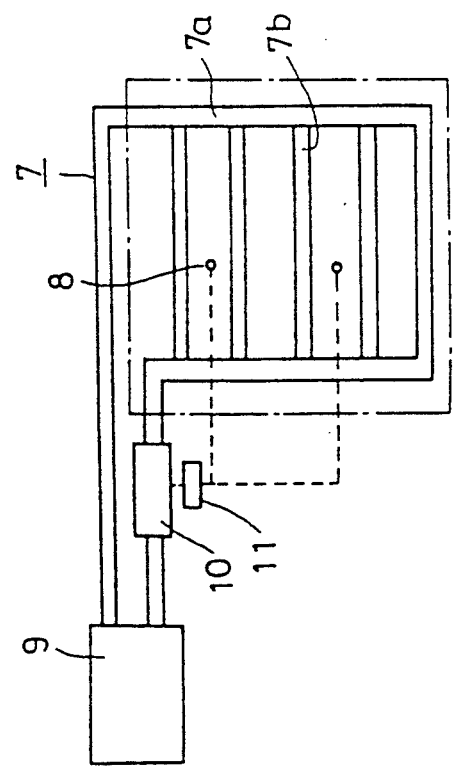
FIG. 3 is a schematic plan illustrating one way in which said water supply system piping might be arranged.

FIG. 3 shows one possible arrangement of the water piping 7 and temperature sensors 8 indicated in FIG. 2. The water piping system 7 comprises a main pipe 7a and branch pipes 7b through which hot or cold water stored in a tank 9 can be circulated by means of a pump 10. It is, of course, possible to install separate storage tanks for hot and cold water but, if the whole system is to be prevented from becoming overly complex, it is preferable to supply both the hot and the cold water from a single tank. In order to prevent damage or leaks from the system occasioned by people walking on the turf, it is a good idea to use either synthetic plastic piping for the water piping system 7 or else to use a plurality of short lengths of pipe connected by means of flexible joints. In order to obtain the optimum performance from the system, the main pipe should be made of comparatively thick piping of some 10 mm to 50 mm in diameter while the branch piping should be made from either flexible or short lengths of thin pipe fitted with fins in order to enhance their ability to radiate or absorb heat. Since the temperature detection range of the protection layer 2 conforms more or less to the atmospheric temperature range, an electrical resistance thermometer makes a perfectly adequate temperature sensor 8. It would also be possible simply to measure the air temperature, providing that there was a satisfactory means of ascertaining the correlation between the temperature of the protection layer 2 and the atmospheric temperature.

Figure 4:
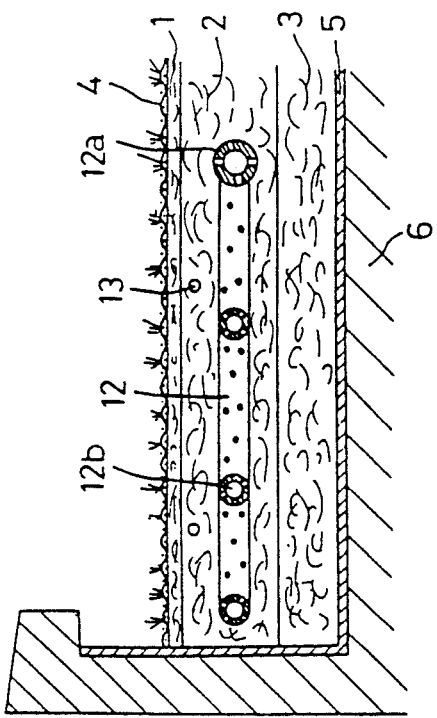
FIG. 4 is a cross sectional view of the third preferred embodiment of the invention wherein the structured medium of FIG. 1 has also been fitted with additional water and liquid fertilizer piping and a moisture sensor.

In order to make best use of the temperature data returned by the temperature sensor 8, it is also possible to fit an upper and lower temperature setting unit 11 as shown in FIG. 3 which can then be used to control the flow of water automatically by, for example, causing cold water of 15° C. or less to circulate through the system whenever the temperature sensor indicates that the temperature of the protection layer 2 has risen above an upper limit of say 25° C., or by causing hot water of 30° C. or more to circulate through the system whenever the temperature sensor indicates that the temperature of the protection layer 2 has slipped below a lower limit of say 5° C. The addition of this sort of instrumentation enables the more effective maintenance of suitable conditions than might otherwise be possible using the simpler setup illustrated in FIG. 1. The temperatures in the example above have, of course, been chosen simply by way of illustration and actual upper and lower temperature limits and more appropriate water temperatures should always be selected to suit local environmental conditions. FIG. 4 illustrates what is essentially the same sort of structured medium as the one shown in FIG. 1 but with the internal elements designed to achieve a more positive level of plant growth. In the figure, 12 is a pipe with multiple perforations in its walls to facilitate the supply of water or of a liquid fertilizer to the medium. 13 is a moisture sensor which is used in the management of the moisture retention level of the structured medium. The amount of water and fertilizer must be absolutely right if plant roots are to achieve their required growth and it follows from this, of course, that the maintenance of appropriate quantities of nutrients and moisture in the protection layer 2 is also of particular importance in the prevention of problems such as plant disease. One or more moisture sensors 13 should be fitted as appropriate at or close to the center of the protection layer 2 as illustrated in FIG. 4. For reasons similar to those outlined above, it is also most effective if the perforated piping 12 is also fitted within the protection layer 2 as also shown in FIG. 4.

Figure 5:
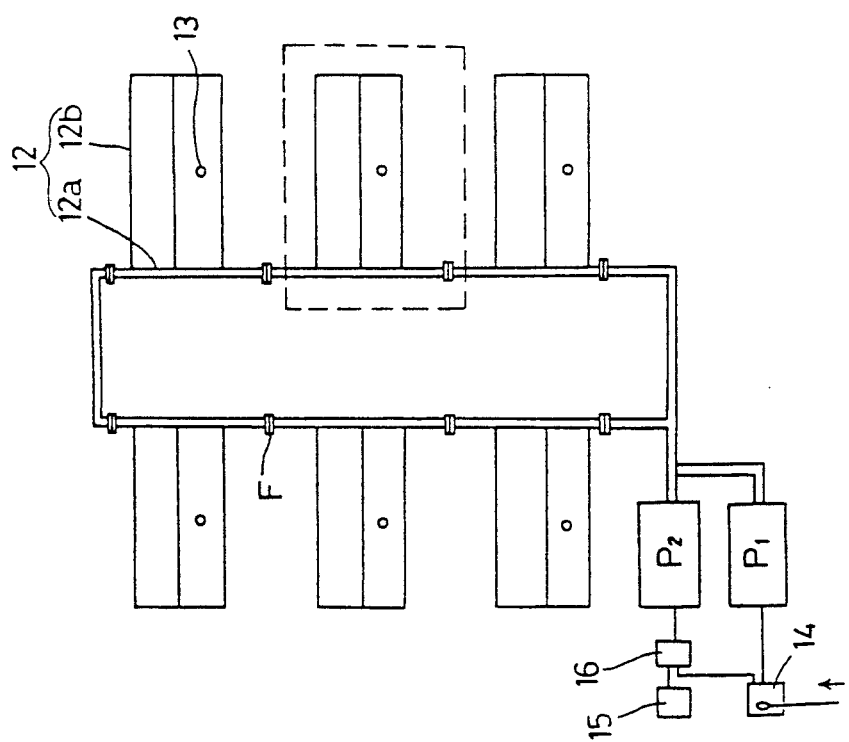
FIG. 5 is a schematic plan illustrating one way in which said water and liquid fertilizer supply piping might be arranged.

FIG. 5 shows a possible arrangement of the perforated piping 12 and moisture sensors 13 which are shown in FIG. 4. The perforated piping 12 comprises a main pipe 12a with a diameter of between 10 mm and 50 mm from which a number of branch pipes 12b are taken off. These pipes from a system in combination with a group of tanks, which include a water tank 14, a fertilizer tank 15 and a liquid fertilizer tank 16, and two pumps P1, P2. By feeding water into the water tank 14 from an external source and by feeding fertilizer into the fertilizer tank 15 from a similar external source, it is possible to control the supply of water and liquid fertilizer in accordance with a predetermined program. Fertilizer drawn off from the fertilizer tank 15 is fed through into the liquid fertilizer tank 16 where it is mixed with water drawn off from the water tank 14 to form a solution of an appropriate concentration which is then pumped through the perforated piping 12 with the help of the pump P2. It is not necessary to feed both water and liquid fertilizer through the perforated piping 12 at the same time, thus enabling the adoption of a selective feed technique. It is, moreover, standard practice to pump the liquid fertilizer through the system less frequently than the water. The perforated piping 12 must not only be capable of withstanding the weight of a person walking on the turf above without incurring damage but be able at the same time to deliver an adequate supply of moisture. It is also important to prevent roots from infiltrating the piping by way of its perforations. It would be possible to cope with this problem by covering the perforated piping 12 with some sort of soft sheeting but this method has proved rather unreliable. It is better, therefore, to use either porous rubber tubing or a porous ceramic piping to fulfill the function of the perforated piping 12. The use of this sort of porous piping is not simply a handy way of preventing the infiltration of roots into the piping itself but it also represents a means of ensuring, by virtue of the characteristic permeability of such porous piping, that whenever the protection layer 2 starts to become deficient in moisture then the situation will immediately be rectified by the percolation of either moisture or nutrients or both out of the piping and into the protection layer 2. It is in this way possible to provide a continuous supply of the appropriate amount of water and fertilizer for the grass and plants. As an alternative to the above system, it would be perfectly acceptable to use non-perforated piping for the main piping 12a and to use perforated piping of some sort only for the branch piping 12b sections. In FIG. 5, F marks the joints in the main piping 12a.

Any one of a number of known sensors which operate on the principle of conductivity may be used as the moisture sensor 13. This sensor enables the detection of the level of moisture retention of the protection layer 2 and the subsequent supply of water and fertilizer on the basis of the sensor readings. During periods of rainfall or when sprinklers are in use, for example, the protection layer 2 will contain ample moisture and the water supply will be suspended on detection of this condition by the moisture sensor 13. When the protection layer 2 begins to dry out, however, then the supply of water via the perforated piping 12 will be resumed automatically. It would be perfectly possible to replace the pumped circulation of water and fertilizer through the system using the pumps P1, P2 by a gravity feed method based on the water pressure in each of the tanks. In this case the over-supply of water can be avoided by the insertion of a pressure valve between the tanks and the piping system.

Figure 6:
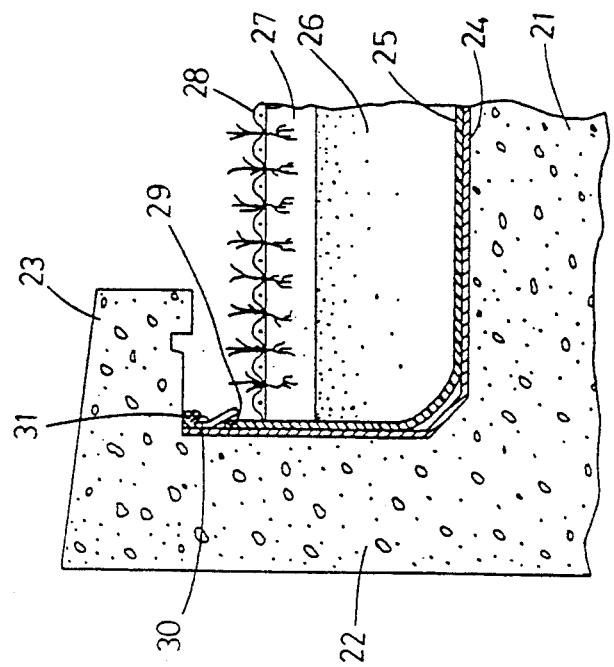
FIG. 6 is a cross sectional view illustrating the installation of a waterproofing course on a roof in conjunction with the structured medium.

FIG. 6 illustrates the waterproofing method adopted in cases where the structured medium of the invention is installed on a roof at the same time as the concreting is being carried out. In the drawing 21 is the concrete placed on the roof slab, 22 is the parapet wall along the side of the roof, 23 is the coping, 24 is the primer coating on the surface of the roof, 25 is the root blocking waterproofing layer, 26 is a protection layer made up of layers of non-woven fabric consisting of glass wool or composite polyester, polypropylene, acryl and similar fibers, 27 is a layer for the cultivation of plants such as grass and 28 is a net which is used both to prevent the grass from being scattered by strong winds, for example, and also to spread the concentrated load applied when a person walks over the surface of the turf. The base flashing 29 of the root blocking waterproofing layer 25 is secured with an angle cleat 30 in order to prevent it from gaping at any point. This part is also sealed with some sort of sealing material or else treated with an asphalt coating 31 in order to ensure its waterproofing characteristics. Although for the purposes of this preferred embodiment, the structured medium has been treated as comprising just two layers and the drainage layer 3 has been omitted, there is no reason whatsoever why a drainage layer should not also be included to make up a triple layered structured medium as illustrated in the first preferred embodiment. The root blocking waterproofing layer 25 functions not only as a waterproofing layer designed in accordance with a waterproofing technique which has conventionally enjoyed wide application but also serves to prevent the encroachment of grass and other roots below the sheet as they begin to get longer. In order to ensure that the root blocking waterproofing layer 25 adequately fulfills this dual function, however, it is necessary that the sheet itself should not be too thin. The inventors have normally favored a vinyl chloride sheet for this purpose but the composition of the sheet is not restricted as such and, providing it is sufficiently soft and thick to fulfill the dual purpose for which it is intended, any sort of synthetic plastic sheeting such as polyethylene sheeting might equally well be used, there now follows a brief description of the techniques required for the creation of the fort of structure outlined above. First the concrete must be placed and then very carefully smoothed using a plastering technique to form the roof slab which must then be thoroughly dried. When the concrete has dried out it is smoothed once again and then treated in order to create a primer layer 24 which will enable things to adhere more readily to the surface of the concrete. These techniques are already known but in the case of the present invention, the creation of a particularly smooth concrete surface may be deemed sufficient in itself and the application of the primer layer 24 may consequently be dispensed with. Next adhesive is applied at suitable intervals over the surface of the primer layer 24 and the root blocking waterproofing sheet is then stuck onto this surface. This sheet now constitutes the root blocking waterproofing layer 25. The adhesive should not be applied to the whole surface of the primer layer 24 for the following reason. The roof of a building is subject to fairly substantial fluctuations in ambient temperature and, since the thermal expansion of substances such as vinyl chloride is large, the all over adhesion of the root blocking waterproofing sheet to the primer layer 24 would result in the application of excessive force to the sheet due to the difference between the rates of expansion and contraction of the slab surface and of the root blocking waterproofing sheet with the result that the sheet would inevitably be torn. Although the root blocking waterproofing sheets are, of course, laid such that they overlap each other by a specified amount, it is nevertheless of particular importance to use an adhesive appropriate to the type of material of which the sheets are made in order to prevent water leaking through at the points where the sheets actually overlap. Depending on the type of sheeting material used, thermal compression may be preferred to adhesive as a means of joining the individual sheets. When the root blocking waterproofing layer 25 has be laid in the manner outlined above, the base flashing 29 must then be secured with the help of an angle cleat 30. Finally, and most importantly, a sealing material of some sort or alternatively a coating of asphalt 31 must be applied to the area around the angle cleat in order to ensure that the join is completely waterproof. The protection layer 26 is then laid to the required thickness, the cultivation layer 27 is laid on top and finally the net 28 is laid over the top of the whole structured medium to hold it firmly in place. It has already been pointed out above that an additional drainage layer can be laid underneath the protection layer 26 in areas which are prone to particularly heavy rainfall, for example. In this sort of case, that part of the root blocking waterproofing sheet which lies around the drain must be cut away and the edges fully waterproofed such that once water collects in the drainage layer it will immediately be drained away via the drain.

Figure 7:
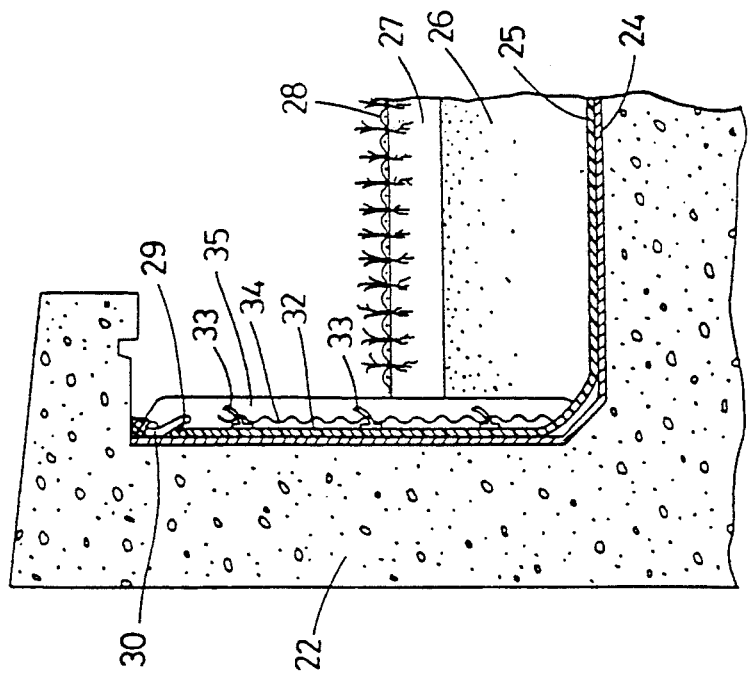
FIG. 7 is a cross sectional view of a preferred embodiment of the invention wherein a reinforcing layer has also been added to the waterproofing course illustrated in FIG. 6.

FIG. 7 is a cross sectional drawing illustrating the technique used for reinforcement of the root blocking waterproofing layer 25. In cases such as that shown in FIG. 6 where the protection layer 26 and the cultivation layer 27 are fairly thick by comparison with the height of the parapet wall 22, there will not be much of the root blocking waterproofing layer 25 actually exposed on the face of the parapet wall itself. In most cases, however, since a parapet wall 22 may be expected to be in the region of 50 cm in height as against a total thickness of just 10 cm or so for both the protection layer 26 and the cultivation layer 27 together, the root blocking waterproofing layer 25 is likely to be exposed over a substantial stretch of said parapet wall. However, since the materials which are used to make the root blocking waterproofing layer 25 consist of a soft and flexible synthetic plastic of one sort or another, as was explained above, this material may easily be damaged by a sharp instrument or a cutting edge of any sort. The exposed area may also deteriorate as a result of chemical changes induced by the incidence of ultraviolet light on its exposed surface. Thus, in cases where the exposed surface is fairly substantial as shown in FIG. 7, one method of dealing with the problem would be to insert hooks 33 into the vertical surface 32 of the root blocking waterproofing layer 25 and then to fix a metal lath 34 onto said hooks 33 and to cover this with a final coating of protective mortar which would serve as a reinforcing layer holding the layer below firmly in place. Reinforcement could equally be achieved by extending the lower edge of the angle cleat 30 and using this as a shield for the exposed root blocking waterproofing layer below. The adoption of one or other of the techniques outlined above serves not only to protect the exposed section from physical and chemical deterioration but also to enhance its performance as a waterproofing means.

As was pointed out above, these sorts of techniques are generally put to use during the final phase of the construction of a building but this does not mean that they cannot be effectively used as means of renovating the roof area of an existing building, for example. In the case of an existing exposed waterproofing course, first clean the exposed area thoroughly and then, when all the dirt has been completely removed, apply an adhesive at suitable intervals. Next lay the root blocking waterproofing sheet onto which the protection layer 26, the cultivation layer 27 and finally the net 28 can then be laid. In this sort of case, since the roof area has already been fully waterproofed, there is no particular need for the same rigorous finishing of the root blocking waterproofing layer 25 in the neighborhood of the base flashing 22 as would otherwise be required. The addition of a reinforcing layer is nevertheless to be preferred in order to protect the sheet from damage.

It is also quite common in the case of exposed waterproofing to cover the asphalt waterproofing layer with a further layer of sanded bituminous felt for added protection. It is, however, difficult to lay the root blocking waterproofing sheet of the invention directly over this type of sanded bituminous surface. The soft root blocking waterproofing sheet may also be damaged by friction between itself and the sanded bituminous felt and it is, therefore, preferable that the felt be removed altogether before laying the root blocking waterproofing sheet. The techniques outlined in connection with this invention can still be used effectively even if there is a protective concrete covering laid over the asphalt waterproofing layer. It is essential that the surface of the concrete be thoroughly cleaned prior to commencement of the procedures described above.

It is thus possible, using the structured medium of the invention, to cultivate turf, for example, on a roof or balcony while at the same time providing fully effective waterproofing protection for the building underneath. Said turf would also be capable of withstanding the weight of people walking on it. The cultivation of turf on the roof of a building will also provide it with protection against excessive heat intake via the roof slab during particularly hot weather. The temperature on the surface of a roof which has no grass cover can easily rise to 60° C. or more during hot weather and the roof slab itself may rise above the 40° C. level. Cultivation of turf on the roof of a building by means of this invention will, however, by virtue of the living nature of the plant itself and the cooling effect of the moisture contained in the protection layer, keep the temperature of the roof's surface just marginally above the temperature of the atmosphere in the vicinity of the roof. Moreover, at slab temperatures of less than 30° C., the phenomenon of excessive heat transfer into the building was entirely absent. The environment in the living areas on the top floor of a building has in this way been improved immeasurably. Moreover, although it has been found that heat reflected by a roof on which the concrete remains exposed causes the temperature to rise even while in shadow, this type of reflection related temperature rise was not found on roofs on which the invention was installed. The control of reflection not only has the effect of guarding against abnormal localized temperature increases but also prevents the sort of deterioration of the concrete walls which can result from exposure to the ultraviolet rays contained in reflected light.

What is claimed is:

1. A structured medium for the cultivation of greenery comprising:
   three vertically stacked layers of which at least the top two consist primarily of synthetic fibers;
   the topmost layer being an unpartitioned cultivation layer which does not contain soil and which facilitates germination and cultivation of greenery such as turf, and having fiber density, ventilation and moisture retention characteristics which lie in between those of the other two layers;
   the middle layer being a protection layer supporting roots of said greenery and providing an adequate level of ventilation and having fiber density and moisture retention characteristics greater than those of the other two layers; and
   the bottom layer being a drainage layer supporting said cultivation layer and said protection layer and providing a level of ventilation higher than that of the other two layers, as well as considerable drainage capacity and a measure of elasticity.

2. The structured medium for the cultivation of greenery according to claim 1 in which the material from which the cultivation layer and the protection layer are made is in each case a non-woven fabric consisting primarily of synthetic fiber.

3. The structured medium for the cultivation of greenery according to claim 1 in which the material from which the drainage layer is made comprises a non-woven fabric consisting primarily of synthetic fiber.

4. The structured medium for the cultivation of greenery according to claim 1 in which the drainage layer comprises vertically stacked, two plastic sheets which are supported in such that there is a small gap between them and in which the upper plastic sheet contains a plurality of perforations through which water is able to pass.

5. The structured medium for the cultivation of greenery according to claim 1 further comprising a water piping system to enable selective circulation of hot or relatively, cold water through an interior of said structured medium.

6. The structured medium for the cultivation of greenery according to claim 1 further comprising a system of pipes in the interior containing a plurality of fine perforations for the delivery of a supply of water and liquid fertilizer.

7. A structured medium for the cultivation of greenery comprising:
   three vertically stacked layers of which at least the top two consist primarily of synthetic fibers;
   the topmost layer being a cultivation layer which facilitates germination and cultivation of greenery such as turf and having fiber density, ventilation and moisture retention characteristics which lie in between those of the other two layers;
   the middle layer being a protection layer supporting roots of said greenery and providing an adequate level of ventilation and having fiber density and moisture retention characteristics greater than those of the other two layers; and
   the bottom layer being a drainage layer supporting said cultivation layer and said protection layer and providing a level of ventilation higher than that of the other two layers, as well as considerable drainage capacity and a measure of elasticity; and
   wherein said cultivation layer and said protection layer each are made of a non-woven fabric consisting essentially of synthetic fiber.

8. A structured medium for the cultivation of greenery comprising:
   three vertically stacked layers of which at least the top two consist primarily of synthetic fibers;

the topmost of said layers being a cultivation layer which facilitates germination and cultivation of greenery such as turf having fiber density, ventilation and moisture retention characteristics which lie in between those of the other two layers; and the middle layer being a protection layer supporting roots of said greenery and providing an adequate layer of ventilation and having fiber density and moisture retention characteristics greater than those of the other two layers; and the bottom layer being a drainage layer supporting said cultivation layer and said protection layer and providing a level of ventilation higher than that of the other two layers, as well as considerable drainage capacity and a measure of elasticity; and material from which the cultivation layer and the protection layer are made is in each case a non-woven fabric consisting primarily of synthetic fiber.

9. The structured medium for the cultivation of greenery according to claim 8 in which the protection layer comprises a laminate built up from a plurality of sheets of non-woven fabric.

10. A structured medium for the cultivation of greenery comprising:

three vertically stacked layers of which at least the top two consist primarily of synthetic fibers;

the topmost layer being a cultivation layer which facilitates germination and cultivation of greenery such as turf and having fiber density, ventilation and moisture retention characteristics which lie in between those of the other two layers;

the middle layer being a protection layer supporting roots of said greenery and providing an adequate layer of ventilation and having fiber density and moisture retention characteristics greater than those of the other two layers; and the bottom layer being a drainage layer supporting said cultivation layer and said protection layer and providing a level of ventilation higher than that of the other two layers, as well as considerable drainage capacity and a measure of elasticity, the material from which the drainage layer is made includes a non-woven fabric consisting primarily of synthetic fiber.

11. The structured medium for the cultivation of greenery according to claim 10 in which the upper surface of the lower plastic sheet is roughened.

12. A structured medium for the cultivation of greenery comprising:

three vertically stacked layers of which at least the top two consist primarily of synthetic fibers;

the topmost layer being a cultivation layer which facilitates germination and cultivation of greenery such as turf having fiber density, ventilation and moisture retention characteristics which lie in between those of the other two layers;

the middle layer being a protection layer supporting roots of said greenery and providing an adequate layer of ventilation and having fiber density and moisture retention characteristics greater than those of the other two layers; and the bottom layer being a drainage layer supporting said cultivation layer and said protection layer said drainage layer providing a level of ventilation higher than that of the other two layers, as well as considerable drainage capacity and a measure of elasticity, the drainage layer including two vertically stacked plastic sheets which are supported such that there is a small gap between them and in which the upper plastic sheet contains a plurality of perforations through which water is able to pass.

13. A structured medium for the cultivation of greenery comprising:

three vertically stacked layers of which at least the top two consist primarily of synthetic fibers;

the topmost layer being a cultivation layer which facilitates germination and cultivation of greenery such as turf and having fiber density, ventilation and moisture retention characteristics which lie in between those of the other two layers;

the middle layer being a protection layer supporting roots of said greenery and providing an adequate layer of ventilation and having fiber density and moisture retention characteristics greater than those of the other two layers; and the bottom layer being a drainage layer supporting said cultivation layer and said protection layer said drainage layer providing a level of ventilation higher than that of the other two layers, as well as considerable drainage capacity and a measure of elasticity; and a water piping system to enable selective circulation of relatively hot or cold water through an interior of said structured medium.

14. The structured medium for the cultivation of greenery according to claim 13 in which said water piping system is incorporated into the protection layer.

15. The structured medium for the cultivation of greenery according to claim 13 further comprising a temperature sensor located in the interior and connected to said water piping systems such that, when said temperature sensor detects a temperature which is at or above a preset upper limit, then cold water is circulated through the piping system and when said temperature sensor detects a temperature which is at or below a present lower limit, then hot water is circulated through the piping system.

16. The structured medium for the cultivation of greenery according to claim 15 wherein a drainage layer is inserted between a root blocking the waterproofing layer and the protection layer.

17. The structured medium for the cultivation of greenery according to claim 15 wherein a reinforcing layer is fitted to the surface of a root blocking waterproofing layer at points where said root blocking waterproofing layer lies vertically against a parapet wall.

18. A structured medium for the cultivation of greenery comprising:

three vertically stacked layers of which at least the top two consist primarily of synthetic fibers;

the topmost layer being a cultivation layer which facilitates germination and cultivation of greenery such as turf and having fiber density, ventilation and moisture retention characteristics which lie in between those of the other two layers;

the middle layer being a protection layer supporting roots of said greenery and providing an adequate layer of ventilation and having fiber density and moisture retention characteristics greater than those of the other two layers; and the bottom layer being a drainage layer supporting said cultivation layer and said protection layer said drainage layer providing a level of ventilation higher than that of the other two layers, as well as considerable drainage capacity and a measure of elasticity; and a system of pipes into the interior of said medium containing a plurality of fine perforations for the delivery of a supply of water and liquid fertilizer thereto.

19. The structured medium for the cultivation of greenery according to claim 18 in which the aforementioned pipes are made of a porous ceramic.

20. The structured medium for the cultivation of greenery according to claim 18 in which the aforementioned pipes are made of porous rubber tubing.

* * * * *